A. O. WILCOX.
Improvement in Electro-Magnetic Burglar and Safe Alarm.

No. 128,691.  
Patented July 2, 1872.

6 Sheets--Sheet 1.

Witnesses:  
Chas. Kenyon  
Edw.? Masi

Inventor  
A. O. Wilcox  
Chipman, Fosmer & Co  
Attorneys

A. O. WILCOX.
Improvement in Electro-Magnetic Burglar and Safe Alarm.
No. 128,691. Patented July 2, 1872.
Fig. 2.
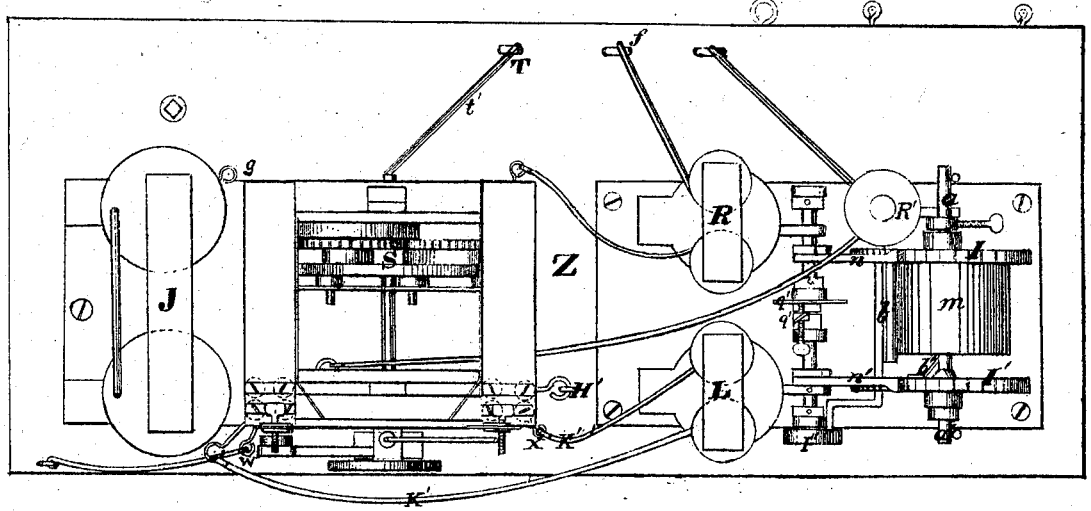
Fig. 3.
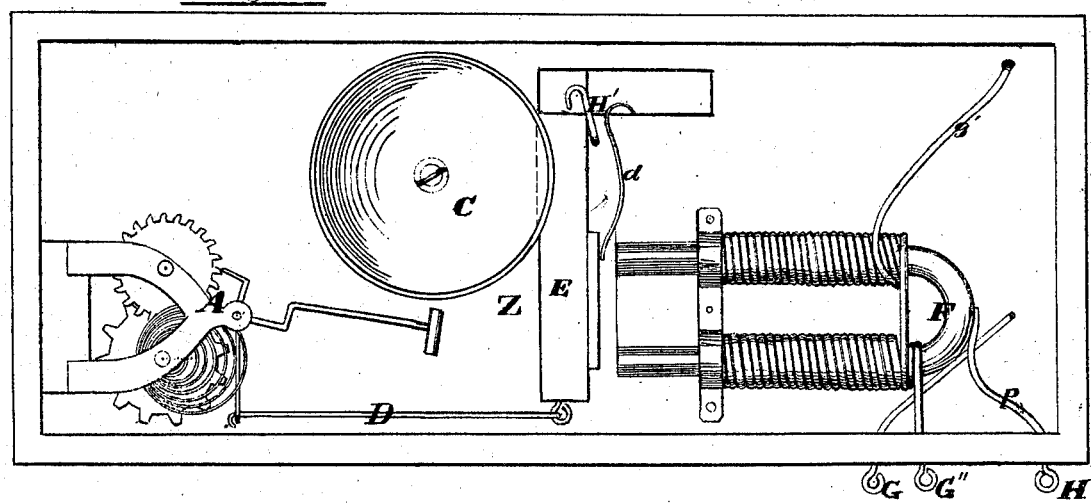
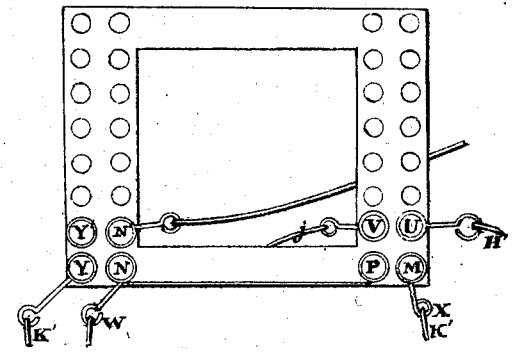
Witnesses:
Chas Kenyon
Edw. P. Mase
Inventor.
A. O. Wilcox
Chipman Hosmer & Co
Attorneys A. O. WILCOX.
Improvement in Electro-Magnetic Burglar and Safe Alarm.
No. 128,691. Patented July 2, 1872.

6 Sheets--Sheet 3.

A. O. WILCOX.
Improvement in Electro-Magnetic Burglar and Safe Alarm.
No. 128,691. 
6 Sheets--Sheet 4.
Patented July 2, 1872.
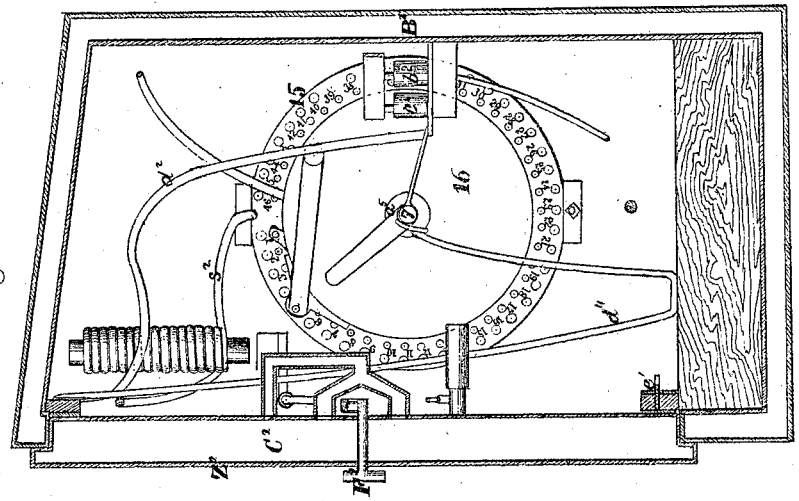
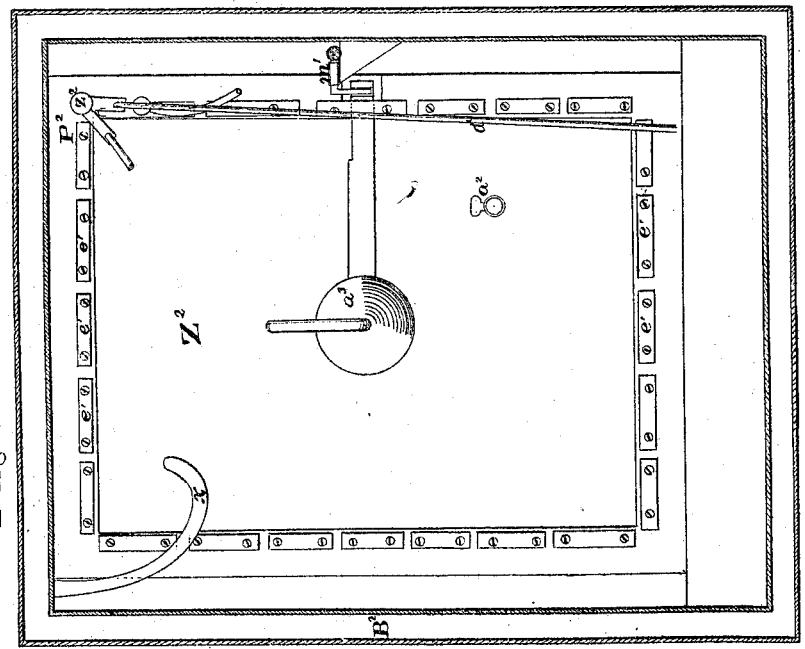

A. O. WILCOX.
6 Sheets--Sheet 5.
Improvement in Electro-Magnetic Burglar and Safe Alarm.
No. 128,691.
Patented July 2, 1872.
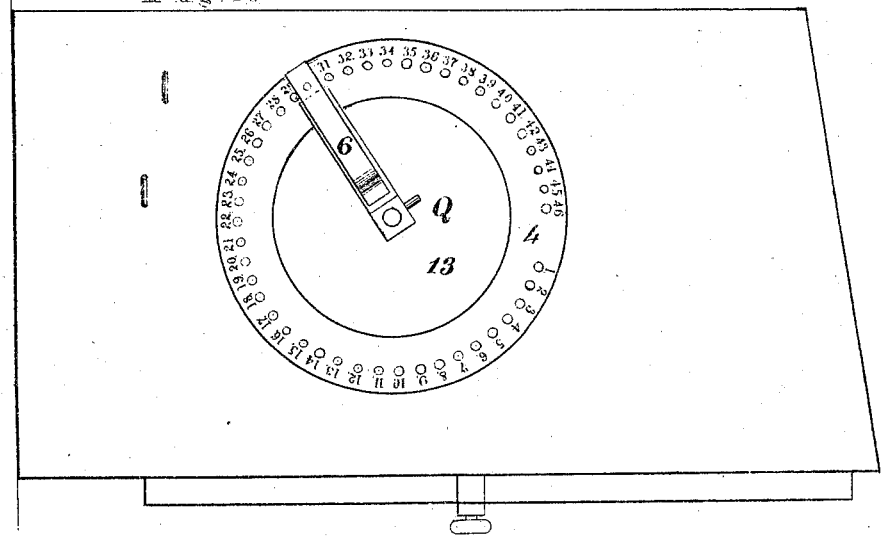
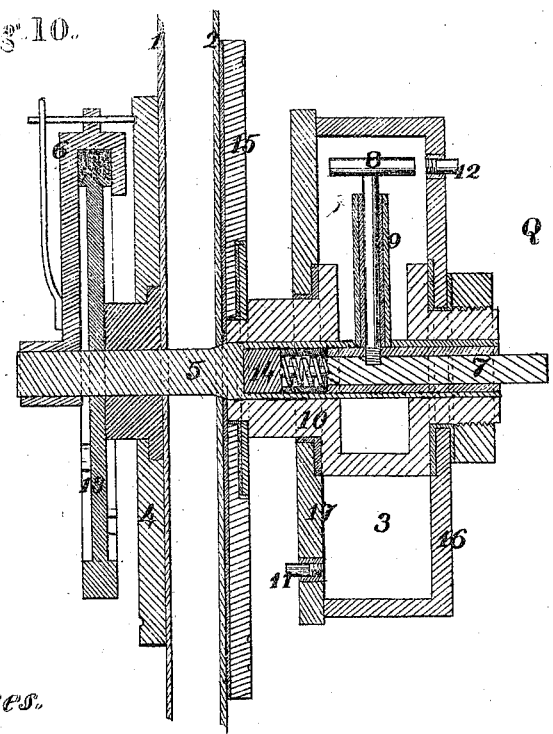

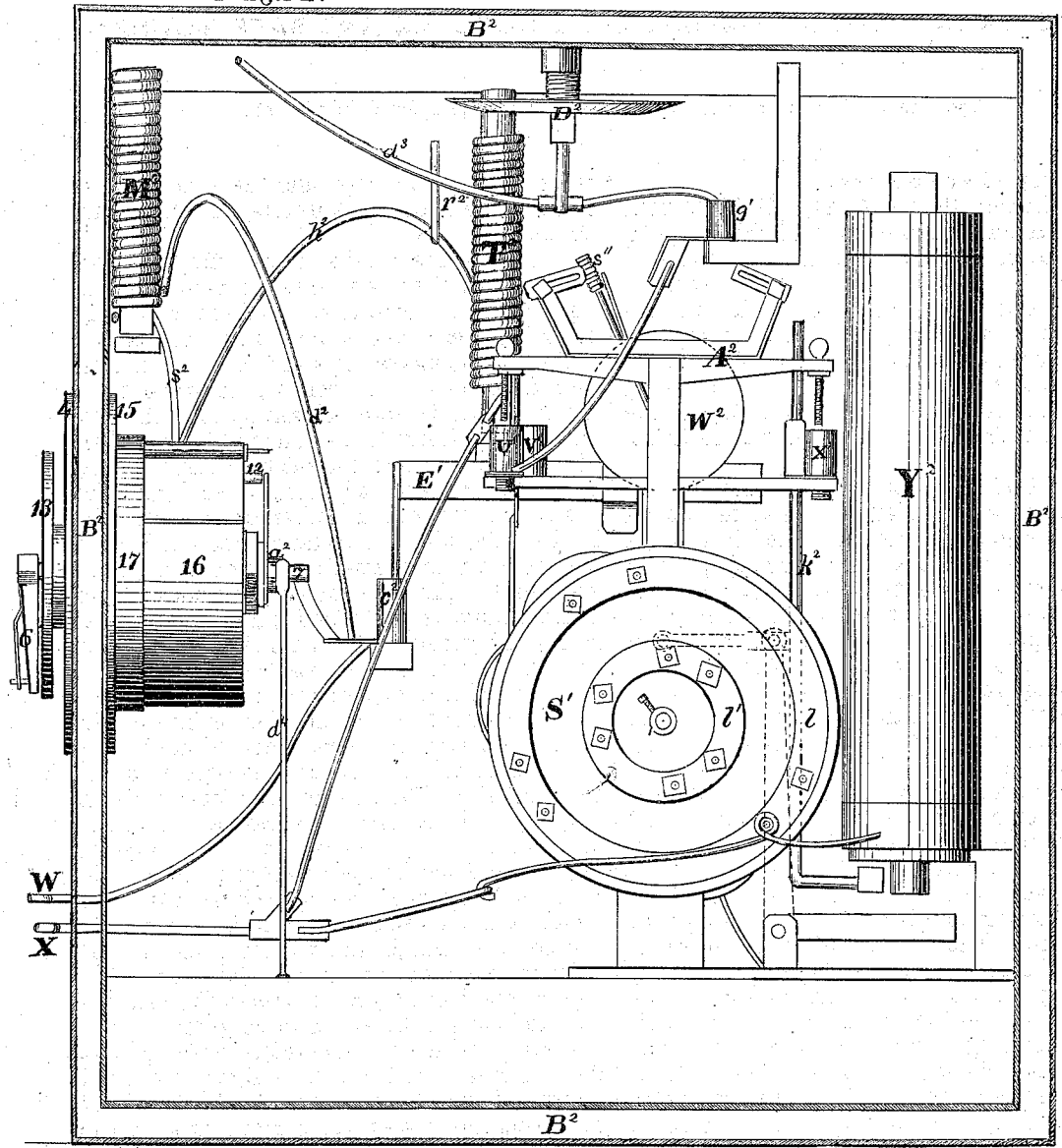

128,691

UNITED STATES PATENT OFFICE.

AUSTIN O. WILLCOX, OF PHILADELPHIA, PENNSYLVANIA.

IMPROVEMENT IN ELECTRO-MAGNETIC BURGLAR AND SAFE ALARMS.

Specification forming part of Letters Patent No. 128,691, dated July 2, 1872.

*To all whom it may concern:*

Be it known that I, AUSTIN O. WILLCOX, of Philadelphia, in the county of Philadelphia, and State of Pennsylvania, have invented a new and valuable Improvement in Burglar-Alarms; and I do hereby declare that the following is a full, clear, and exact description of the construction and operation of the same, reference being had to the annexed drawing making a part of this specification, and to the letters and figures of reference marked thereon.

Figure 1:
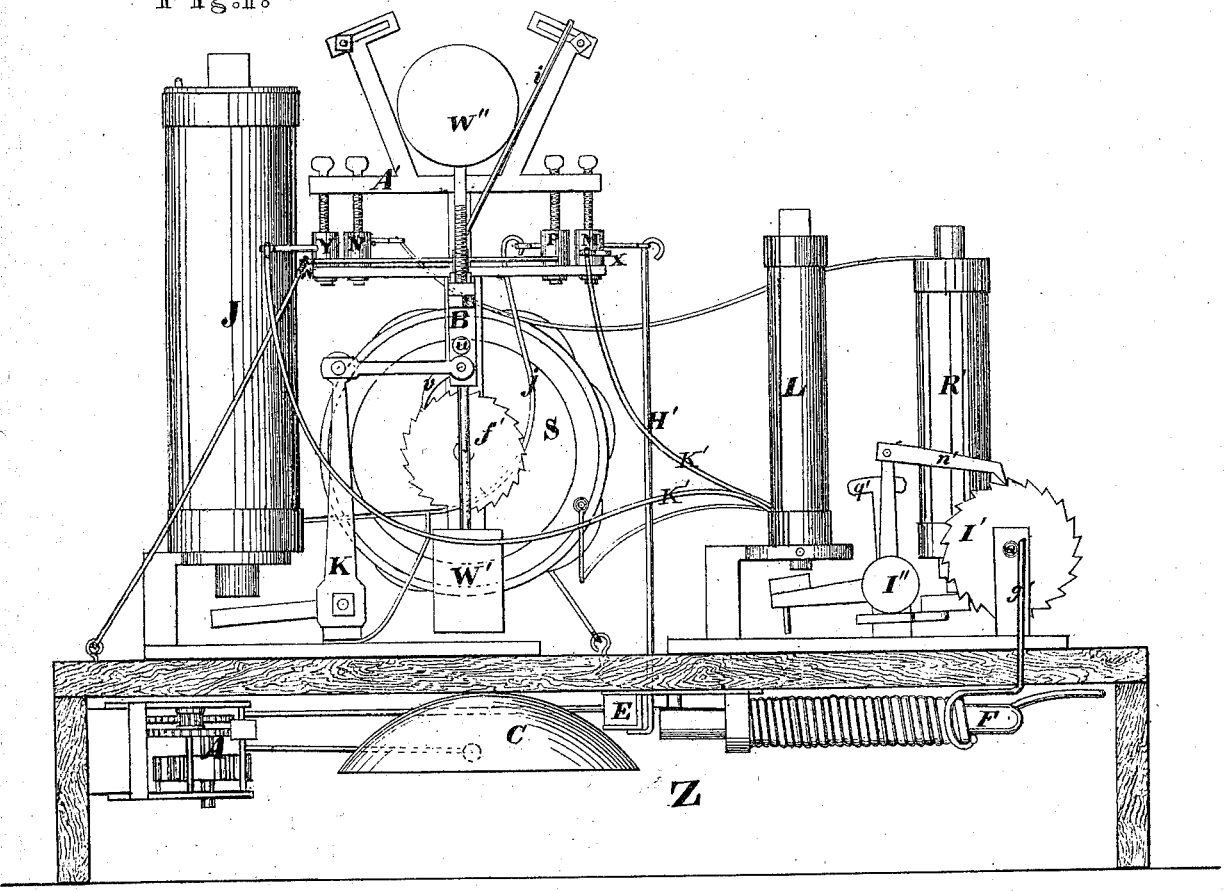
Figure 4:
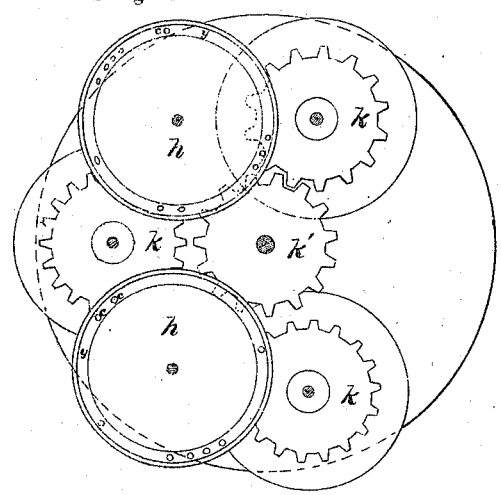
Figure 6:
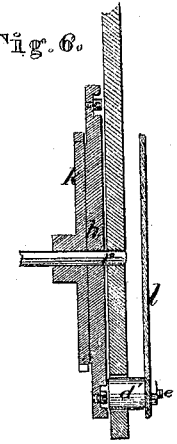
Figure 5:
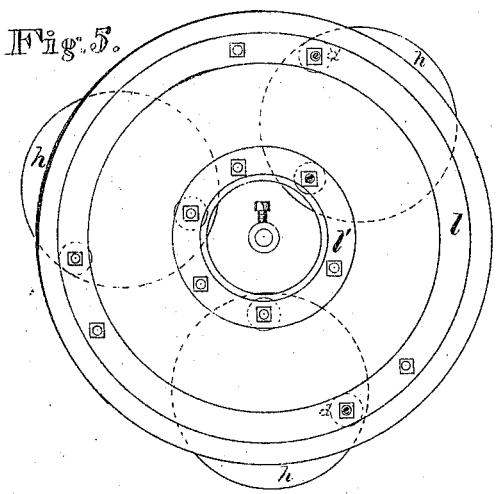
Figure 12:
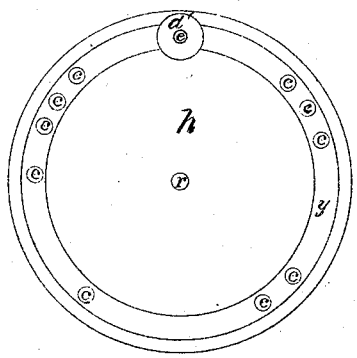

Figure 1 of the drawing is a representation of a side view of the apparatus at the alarm-station. Fig. 2 is a top view, and Fig. 3 is a bottom view of the same. Figs. 4, 5, 6, and 12 are details of commutator. Fig. 7 is a vertical section of safe, showing rear of guarded door. Fig. 8 is a vertical transverse section of the safe. Fig. 9 is an end view of the safe, showing the face of the lock-switch. Fig. 10 is a sectional view of the lock-switch. Fig. 11 is a longitudinal section of the safe, showing the apparatus inside. Fig. 13 is a detail.

My invention has relation to the application of electro-magnetism to safes, banks, and treasury-vaults, deposit-vaults, and safety-funds, for the better protection and security thereof; and consists in the employment of two register-circuits, both communicating with the watchman's table, and one extended to include the safe or vault, their concord of action being essential to the preservation of the alarm-circuit; in the arrangement of the similar permutating commutators, whereby the safe-circuit and that upon the watchman's table are made and broken at the same moments of time, the intervals between these moments being of varying lengths, and practically indeterminate in the switching movements adjusted to the commutators, on long lines, to prevent the necessity of a double set of wires; in the means provided for the prevention of any irregularity which the varying tensions of the currents might have a tendency to produce; in the method of preserving the alarm-circuit by the concordant action of the register-circuits; in the guarded door; and in the lock-switch, designed to enable the latter to be opened without disturbing the alarm-circuit.

In the apparatus there are five distinct currents employed, comprising the two register-circuits, the two motor-circuits, and the alarm-circuit.

Reserving the details of the different parts actuated by these currents for more particular description hereafter, I will at first advert to their general connection and operation.

The two separate registers, R and L, are required to operate in concord to prevent the alarm-circuit G from breaking, and thereby causing the alarm to be sounded. The register R has its circuit established through the commutator S at hand on the base Z, and the register L through a similar commutator, S', in the safe, while the alarm-circuit G has its connection near the peripheries of their ratchet-wheels. The cycle of permutations of the commutators is prolonged through great periods, and produced from a sufficient number of changes not to be forecast.

The watchman's commutator S is operated in such a manner as to control the commutator S' in the safe as to its verge-wheel or air-vessel, and the two being identical in construction, the safe-circuit cannot be tampered with without giving an alarm, unless access be allowed to the commutators themselves. The register end is protected by the pressure of the watchman, and the safe end by the air-vessel, in which it is inclosed. If, by puncture or otherwise, the equilibrium within and without this air-vessel or intersticial chamber be restored, the diaphragm D'' breaks the safe-circuit and causes the alarm to be given.

Again, the door is connected with its seat by a series of insulated bridges, attached alternately to the seat and to the door, and operating to convey the current around the door when closed, but serving to break the circuit upon the least opening thereof. The lock-switch also is arranged in such a manner that it cannot be turned by a person ignorant of the combination of numbers upon which it is adjusted without causing the alarm to be sounded. Hence it is impossible for a person unacquainted with the combination upon which the lock-switch is set to gain access to the safe or vault without causing an alarm to be given at any desired station or stations.

A more minute description of the several parts of the apparatus will now be given.

The terminal points of the alarm-circuit are shown on the side of the base at G and G″. The circuit commences at G, passes under the base Z, whence it extends up through the same and connects with the shaft $a$ of the ratchet-wheel I. On the back of the ratchet-wheel I is secured, for the purpose of insulation, the wooden block $m$, in which is stepped the shaft $a^1$ of the duplicate ratchet-wheel I′. These shafts $a$ and $a^1$ are conductors of the alarm-circuit only when the inwardly-projecting wire $b$, attached to the wheel I near its perimeter, is in contact with the spring $b^1$ similarly placed on the other wheel. Hence, if the pawls $n$ $n^1$ should from any cause operate unequally, a separation of the wire $b$ and spring $b^1$ will take place, breaking the circuit. From the shaft $a^1$ the current passes down on the wire $g^1$ through the base Z.

The wire $g'$ is sufficiently coiled around the poles of the electro-magnet F to keep the lever E in contact therewith when the current is intact, in opposition to the force of its spring $d$, and thereby, through the wire D, controlling the verge of the clock-alarm A and preventing the hammer from striking on the bell C. Should the circuit be broken the verge is at once freed and the alarm sounded. From the electro-magnet F the current passes off, terminating the circuit at G″. The circuit of the register electro-magnet R, whose armature and attached pawl $n$ works the ratchet-wheel I, begins at $f$, and, after forming the helices around the poles of the electro-magnet R, proceeds to the commutator S on the base Z or table of the watchman. This instrument makes or breaks the current of the electro-magnet R, according to a regular system of permutation, produced by a sufficient multiplication of the system indicated in Fig. 12 of the drawing. This represents a disk, $h$, of metal turning upon a shaft, $r$, having on its reverse side a wheel, $k$, attached with a certain number of teeth. This disk $h$ has a recess, $y$, turned in its side, with firm short pins $c$ of wire inserted into holes in the bottom thereof and adjustable with reference to their distances apart, terminating flush with the face of the disk. Pressed against this disk is the smaller one $d'$, with whose center the insulated wire $e$ coincides. By the rotation of the disk $h$ its pins $c$ are severally brought into contact with the insulated center $e$ of the disk $d'$, thereby making or breaking the circuit. In the drawing I have illustrated the commutator as comprising five such disks $h$ arranged in the frame thereof in a circular manner about the central toothed wheel $k'$, with which the wheel $k$ of one of the terminal disks $h$ engages, operating in turn the adjacent disk, which engages with the next, and so on throughout the five. Each wheel $k$ is provided with one tooth less than the preceding wheel, commencing with fifty-two teeth and ending with forty-eight, and their pitch is such that when the wires or pins $c$ $c$ in the recesses in the disks $h$ $h$ are placed in spaces corresponding with such pitch the make or break in any of the five disks will be precisely in agreement therewith, and the different tension-currents, with their varying striking distances, will not be allowed to produce a different permutation of circuit. The wheels $k$ being little over one-half the diameter of the disks $h$, their teeth can be made to engage only by reversing their faces. Each disk is arranged to connect with two insulated wires, $e$ $e$, themselves connected by the ring-conductors $l$ $l'$ without the frame. The wires $c$ $c$ are placed in the recess $y$ at irregular intervals from each other, care being taken to make their seats coincide with radial lines through the pitch-spaces of the wheels $k$. Hence, the length of one of these intervals will never be less than the pitch of the wheel $k$. It will now be apparent that the first disk $h$ (the smaller ring-conductors $l'$ not being used in this circuit) will make and break current as many times as there are pins $c$ $c$ to repeat the same number on the next rotation. The same is true of each of the other disks, and therefore, if they revolved with equal velocities in times of one general revolution, there might be as many current-beats as the sum of all the wires in the recesses. But should any of the wires in the several disks coincide in time for contact it would be necessary to subtract the number of such coincidences from this sum. According to the arrangement adopted, however, the several disks are rotated with unequal velocities, varying in the ratios of the differences between the consecutive numbers 52 to 48, inclusive, being the number of teeth in the several disks. Hence the cycle of permutation produced is prolonged through as many rotations as would be numbered by the final product of the factors of the several numbers of the teeth in the several wheels. From the commutator S the circuit passes, on the wire $t'$, to its battery-termination at T. Thus it appears that the watchman's commutator S causes the electro-magnet R, by its armature and pawl, to rotate the ratchet-wheel I, the teeth of the latter being advanced by the pawl in unequal intervals of time, varying according to the system of permutation produced as above described. The motor-current of the electro-magnet J on the watchman's table is shown in its battery-terminal at H. From thence it passes, by the wire $p$, to the bar which constitutes the body of the electro-magnet F, and is conducted by the same, when the armature is in contact, to the spring $d$, whence it passes, by the wire H′, through the base Z, upward to the mercury-cup U, to which it is fastened. A′ is an oscillating beam pivoted to a standard; B, a pendulum provided with a compound arrangement of weights, W′ and W″, one at each end of the vibratory bar, which is pivoted at $u$, between them. Just below the point $u$ is pivoted the end of an elbow-lever, K, the lower part of which is formed by the armature of the electro-magnet J, and which serves, as the circuit is made through this magnet, to advance the lower portion of the pendulum-bar, thereby causing the wire $i$ at the upper part to come in contact with one of the reciprocating stops attached to the beam in such a manner as to raise the wire attached to the end thereof out of the cup U. But the motor-circuit is continued from the cup U when this end of the beam is down, to the cup V, whence it passes on the wire $j$, through the electro-magnet J, to its terminal $g$. Consequently the armature is immediately elevated, throwing this end of the beam up and breaking the connection, to be restored again by the falling of the armature. Attached to the pendulum, below the pivot, is the pawl $v$, which operates the ratchet-wheel $f^1$, and thereby the central toothed wheel $k'$ of the commutator S. The length of the tooth of the ratchet-wheel $f^1$ must be equal to or a multiple of the pitch of the wheel $k$. The time of the movement is fixed by the compound arrangement of weights on the pendulum-bar.

The register and motor circuits for the safe-current operate similarly, both in principle and connection, with those just described. The safe motor-circuit is completely controlled by the motor-circuit of the watchman, for it is made and broken at the mercury-cups M and P by the same movement of the beam $A^1$ which operates the cups U and V. As now described, the safe would require two sets of wires for its two circuits. When the safe is at a long distance from the alarm-station a double set of wires is inconvenient and expensive, and they have a tendency to affect each other's currents by induction; hence the arrangement of switching movements, as shown in the drawing, whereby one set of wires is rendered sufficient. In this arrangement, when the beam makes current at the cups M and P, the safe motor-current enters at W and passes out at X. At the same time the beam $A^2$ in the safe unites cups U' and V', whence the current passes through the motor-magnet $Y^2$ in the safe, operating the same in the time of the operation of the motor-magnet J on the watchman's table. Again, when the return movement of the beam of the beam connects the cups N and Y, the cups M and P are unconnected. The current entering at W now passes through N and Y, and, by the wires K' K', through the register-magnet L, and, by connection, out at X. At the same time the safe-beam $A^2$ connects the cups U' and X', carrying the current through the commutator S' to operate the magnet L, as the commutator S operates its magnet R, and according to the same system of permutation. It will be perceived that the motor-currents operate their verge-weights without directly moving the commutators. These are moved by the gravity alone of the verge-weights, and hence with equal velocities.

R' designates the guard-magnet, which operates to bind at certain times the movement of the wheel I' by contact with the friction-pulley I''. It will be observed that the armature of this magnet, when the current is not passing, operates as a weight upon a long leverage to bind the friction-pulley, and thereby the wheel I', also. But when the current is not passing the wheel is left free to obey the current through the magnet L. It is evident that when the switching movement takes place at the cups M and P, if the current is on the magnet L, it will be disconnected therefrom, to be again united therewith by the return switch connecting the cups N and Y, thus producing a beat independent of the commutator S', and a corresponding movement of the wheel I'. This movement is prevented by binding the wheel I', in the times of the switching movements, by the guard-magnet R', the connection being made through the cups N' and Y', which are connected by the same movement of the beam which connects the cups N and Y. The timing of the action of the guard-magnet R' is so regulated by the adjustment of the wires in the cups N' and Y' that the connection shall be broken at these cups at the instant before making connection at the cups M and P, and made at an instant after the connection at the cups N and Y.

The verge-weights connected with each commutator are arranged to have a half-pendulum beat, and a proper adjustment of the two weights on each stem will cause the safe-commutator to have a tendency to advance in its movement before that of the commutator on the watchman's table. This advance is prevented by causing the safe-commutator to remain on the up-beat until relieved by the return beat of the watchman's commutator. This is accomplished by means of the upright lever $k^2$, pivoted to the frame-work of the standard within the safe in such a manner that when the small armature attached to its lower end is attracted by the pole of the magnet $Y^2$ the upper end thereof will bind against the end of the oscillating-beam, holding it firmly. The verge-weight is therefore also held in its upward position, and its spring $s''$ in tension to instantly operate the beam when the current in magnet $Y^2$ is broken, by the disconnection of the cups M and P.

The air-vessel which protects the safe and its commutator is provided with double walls, arranged to form one continuous air-tight interstitial chamber, $B^2$. The door $Z^2$ is also made hollow, forming a similar air-tight chamber, $C^2$, which is connected with the chamber $B^2$ by a flexible tube, X. The door is provided with a stop-cock, $a^2$, whereby communication is established with the interstitial chambers, for the purpose of rarefying the air therein, or increasing its density, as may be necessary. This air-chamber may inclose an ordinary safe exteriorly, or it may be placed within the same. It may also be built up within the wall of the safe or vault. Instead of air, a liquid may be used to fill the interstice.

Referring now more especially to the operation and connection of the branch-currents within the safe, it will be observed that these currents enter and return by the wires W and X, respectively. Regarding W as the positive wire, it proceeds to the cup $b^2$, which, when the lever E' is down, connects with cup $c^2$ and thence with wire $d^2$, which unites with the circuit formed when the door is closed by the series of insulated metallic bridges e' e', attached alternately to the door and to its frame. The least separation of the door from the frame will break the current. From this guard-circuit the current proceeds to the elastic diaphragm $D^2$, which is hollow, and communicates with the air-chamber $B^2$. This diaphragm is adjusted by means of its spring, in accordance with the charge in the air-chamber, and in such a manner that so long as the condition of the charge of air is undisturbed the end of the wire $d^3$ will remain in connection with the mercury in the cup $g'$. From this cup the current passes to cup $U^1$, whence it either passes, by connection with cup $V^1$, through the electro-magnet $Y^2$ out on the negative-wire; or it passes, by connection with cup $X^1$, through the commutator $S^1$ and out as before mentioned. In order to enable the door to be opened without causing the alarm to be sounded, the lock-switch Q is employed. The construction of this switch is shown in section at Fig. 10 of the drawing. The walls which bound the air-chamber of the safe are designated by the numbers 1 and 2. To the inner of these walls is attached the cylinder or case 3, and to the outer wall the plate 4 is secured. 5 designates the main shaft of the switch, keyed upon which is the operating-key or pointer 6. The inner portion of shaft 5 is bored to receive the insulated shaft 7. Secured to this shaft is the insulated radial T-shaped bar 8, which passes through the pipe 9, fastened to the shaft 5. Fitting shaft 5 is the body or hub 10 of the case 3. This body is insulated from the case and also from the plate 15, to which it is secured. The key 6 is bent around the perimeter of the operating disk 13 in such a manner as to be guided thereby. This disk is arbored in the plate 4, and has in its circumference, on each side, a notch or recess, arranged to allow the shaft 5 a slight forward or backward movement necessary in order to enable the cross-piece at the end of 8 to be brought in contact with the wires 11 or 12 when opposite the same. Around the plate 4, near the perimeter thereof, is a series of numbers which serve as a guide to enable the key 6 to be placed in the proper positions corresponding with the combination upon which the switch is adjusted. A corresponding succession of numbers is placed on the disk 15. Slightly within the series of numbers on the plate 4 is a corresponding series of holes or circular depressions, serving to fix the arm or key 6 in position. Two such series of depressions are formed within the circle of numbers on plate 10 and are designed to fix the disk 17 and shell 16, which compose the case 3. In order to use the switch Q it must be known upon what figures the shell 16 and disk 17 are set. Then first adjust the pointer of the arm 6 in the depression corresponding to the number on which the disk 17 is set. This will bring the cross-head of 8 opposite the insulated wire 11. The disk 13 is now turned until the slot on the inner side will permit the shaft 5 to be slightly drawn out, bringing 8 into contact with 11; but the current from cup $c^2$ in the safe passes to shaft 7; hence, when 8 and 11 are in contact the circuit of the electro-magnet $M^2$ will be formed, the current passing thereto by the wire $s^2$, and thence to the safety frame $P^2$ of the door. The armature of the electro-magnet $M^2$ is now drawn up and lifts the catch $m^1$, when the bolt of the door is set at liberty and can be drawn back by the knob $F^2$ or other suitable device. This knob or key should be securely fastened in, and the lock should be backed with an air-tight chamber, $a^3$, connecting with the chamber of the door to prevent boring. The shaft 5 being now pushed back against the disk 13, the cross-head 8 is brought to the center of the case 3 in its original position. The arm 6 is now adjusted to correspond with the number on which the shell 16 is set. This brings the cross-head 8 opposite the wire 12. The disk 13 is now sufficiently turned to enable the shaft 5 to be pushed in, bringing 8 and 12 in contact. The current now passes, by wire $d^4$, from the insulated piece $a^5$ on shaft 7 direct to the point $z^2$ on the safety-frame, making connection there with the wire, which passes to the diaphragm, and enabling the door to be opened without alarm. The circular paths of the cross-head 8 on the disk and shell may be roughened to conceal the position of the wires 11 and 12. If, however, either disk or shell are touched by 8 the wire $h^2$ will operate the electro-magnet $T^2$, raising the lever $E^1$, and thereby breaking the connection between cup $b^2$ and $c^2$, and causing the alarm to be sounded. If it be attempted to bore out the shaft 5 the electro-magnet $T^2$ will be likewise operated; for at the end of the bore in shaft 5 is a small uninsulated cylinder of iron, 14, kept from touching the insulated shaft 7 by an insulated spring, but the least motion of 14 against 7 switches the current from 7 to the body of the air-vessel to return from the wall at $r^2$ and pass through the magnet $T^2$ with the same effect as before.

Referring to the register-circuits, it will be perceived that the shafts of the pawl-levers, worked by the magnets R and L, are provided each with a tin spring, $q^1$, the same being attached to their adjacent ends. One of the springs is arranged to be set up by a thumb-screw against the other in such a manner that the friction between them shall be nearly enough to operate either one from the other. The object of this arrangement is to keep the levers at the same speed, even should the currents of the two commutators vary in tension within certain limits. Thus there will be a mutual assistance when in proper action, the contact being too delicate to enable either to operate the other should the commutator or attachments be interfered with. Finally, when it is desired to give an alarm independently of the watchman, requiring him to make known only the particular safe giving the alarm, the entire apparatus is to be duplicated. Thus a distinct air-vessel receives the several registers of the safes in the neighborhood, and by its own commutator communicates with any desired station or stations. The switching movements adjusted to the commutators are only to be employed on long distances, as before observed where it is advisable to use only a single set of wires. The same is true of their accessories, the switch-binder $k^2$ and the guard-magnet R'. On short distances, when double sets of wires can be conveniently employed, these provisional parts are dispensed with, and the safe is provided with two separate circuits—one for its motor-magnet, and one connecting its commutator with its register-magnet—the mechanism being a precise reduplication of that connected with the watchman's motor and register circuits, and the safe-motor being conditioned upon the watchman's motor-circuit, as before.

The system of permutations on which the commutators are set may be altered at will by varying the positions of the pins in the disks of the several commutators, care being taken to preserve in each a strict reduplication of arrangement of the disks and pins.

The verge-wheels of the commutators may be moved by means of springs, weights, and pulleys, or other mechanical powers. In such cases their movements are controlled by some regulative device similar to the pendulum, herein described, operated by related electro-magnetic currents.

The system of permutation will be rendered more complex by using both ring-conductors $l$ and $l'$, with their insulated projecting wires $e$ $e$; but as the system with one ring-conductor is practically indeterminate, the second may be utilized for the protection of another safe, without the necessity of constructing a separate commutator for this purpose.

I disclaim the enveloping air-chamber, the flexible diaphragm, and the flexible connecting-tube and bottom door.

I claim—

1. In combination with a door-seat provided with a succession of insulated metallic bridges $e$ $e$, a door having a series of similar bridges alternating with those of the door-seat, as and for the purposes specified.

2. The permutating lock-switch Q, as and for the purpose specified.

3. In combination with the shaft 5, the insulated shaft 7 and uninsulated block 14, separated by spring, as specified.

4. In combination with the cross-head 8 and insulated shaft 7, the adjustable rotary shell 16 and disk 17, with their respective insulated wires 12 and 11, as specified.

5. In combination with the lock-switch, the circuit-breaking magnet $T^2$, with its armature-lever E', as specified.

6. In combination with the lock-switch, the magnet $M^2$, operating the catch which secures the bolt of the door.

7. A commutator, arranged to make and break the register-circuit according to an indeterminate system of permutations, as and for the purpose specified.

8. The commutator herein described, comprising one or more rotating disks, each having in its face a circle of adjustable irregularly-spaced conducting-wires, making connection through the insulated wires $e$ $e$, of the conducting-rings $l$ $l'$, with the wire of the register-circuit, as specified.

9. In combination with the register-magnets R and L, the permutating commutators S S', or their equivalents, governing the rotation of the concurrent ratchet-wheels I I', moving simultaneously, as and for the purposes specified.

10. In combination with the commutator S, the motor-magnet J with its circuit, operating a pendulum, B, and thereby moving the oscillating beam A' and verge-wheel $f'$, as specified.

11. The guard-magnet R' with its leverage armature, in combination with the friction-pulley I'', as and for the purposes specified.

12. The switch-binding lever and armature $k^2$, as and for the purposes specified.

13. The air-cushion $a^3$, behind the lock, as and for the purposes specified.

14. In combination with the magnet $Y^2$, the oscillating beam $A^2$, armature lever $k^2$, elbow-lever, and pendulum, as and for the purposes specified.

15. In combination with the enveloping air-chamber, the electro-magnets R and L, having separate circuits, and the alarm-circuit G, as specified.

16. In combination, the hollow-walled case, the register-magnets R and L with their permutating commutators S and S', and concurrent registers I and I', the motor-magnets J and $Y^2$, with their attendant pendulums and oscillating beams, or the equivalent of any of these parts, when constructed to operate as and for the purposes herein substantially shown and described.

17. In combination, a continuous hollow-walled case, and two or more similar permutating commutators, having their separate motor-forces in established relation, operating to move their separate dependent registers in concord, and thereby preserving the circuit of an alarm, one or more of the register-circuits being extended, substantially as specified.

18. The adjustable auxiliary tangent springs $q'$, as and for the purpose specified.

In testimony that I claim the above I have hereunto subscribed my name in the presence of two witnesses.

AUSTIN O. WILLCOX.

Witnesses:
E. W. ANDERSON,
EDM. F. BROWN.